United States Patent
Torigoe et al.

(10) Patent No.: US 10,735,276 B2
(45) Date of Patent: Aug. 4, 2020

(54) SERVER, COMMUNICATION METHOD, AND RECORDING MEDIUM

(71) Applicant: NEC Corporation, Minato-ku, Tokyo (JP)

(72) Inventors: Keisuke Torigoe, Tokyo (JP); Masanori Takashima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 29 days.

(21) Appl. No.: 16/084,672

(22) PCT Filed: Jun. 20, 2017

(86) PCT No.: PCT/JP2017/022657
§ 371 (c)(1),
(2) Date: Sep. 13, 2018

(87) PCT Pub. No.: WO2018/003597
PCT Pub. Date: Jan. 4, 2018

(65) Prior Publication Data
US 2019/0081866 A1 Mar. 14, 2019

(30) Foreign Application Priority Data
Jun. 29, 2016 (JP) .................................. 2016-128354

(51) Int. Cl.
*H04L 12/24* (2006.01)
*H04L 12/721* (2013.01)
(Continued)

(52) U.S. Cl.
CPC .......... *H04L 41/22* (2013.01); *H04L 41/0672* (2013.01); *H04L 41/0806* (2013.01);
(Continued)

(58) Field of Classification Search
CPC ... H04L 41/0654–0659; H04L 41/0677; H04L 41/12–14; H04L 41/22–26;
(Continued)

(56) References Cited

U.S. PATENT DOCUMENTS 6,496,503 B1 * 12/2002 Pelissier ................. H04L 45/00
370/389
6,654,369 B1 * 11/2003 Pelissster ................. H04L 45/00
370/351
(Continued)

FOREIGN PATENT DOCUMENTS

CN   105450521 A   3/2016
EP    1406417 A1   4/2004
(Continued)

OTHER PUBLICATIONS

International Search Report (PCT/ISA/210), issued by International Searching Authority in corresponding International Application No. PCT/JP2017/022657, dated Sep. 12, 2017.
(Continued)

*Primary Examiner* — Brendan Y Higa

(57) ABSTRACT

A server according to the present invention includes: a memory; and at least one processor coupled to the memory, the processor performing operations, the operations includes: storing topology information indicating a topology of a network composed of a plurality of switches; generating network route information indicating a communication route on the network based on the topology information; acquiring, from the switch, a transfer entry learned by the switch based on switch route information indicating a broadcast domain to that a port of the switch included in the network belongs; and mapping the transfer entry and the network route information to the topology information.

9 Claims, 13 Drawing Sheets

(51) Int. Cl.
  *H04L 12/751* (2013.01)
  *H04L 12/715* (2013.01)
  *H04L 12/947* (2013.01)
  *H04L 12/723* (2013.01)
  *H04L 12/937* (2013.01)
  *H04L 12/703* (2013.01)

(52) U.S. Cl.
  CPC .......... *H04L 41/0873* (2013.01); *H04L 41/12* (2013.01); *H04L 45/02* (2013.01); *H04L 45/28* (2013.01); *H04L 45/32* (2013.01); *H04L 45/38* (2013.01); *H04L 45/50* (2013.01); *H04L 45/64* (2013.01); *H04L 49/25* (2013.01); *H04L 49/254* (2013.01)

(58) Field of Classification Search
  CPC ....... H04L 45/00–02; H04L 49/25–256; H04L 12/4641; H04L 41/0803; H04L 41/0866–0873; H04L 41/16; H04L 45/021; H04L 45/04; H04L 45/28; H04L 45/38; H04L 45/50; H04L 47/10; H04L 47/825
  See application file for complete search history.

(56) References Cited

U.S. PATENT DOCUMENTS

| | | |
|---|---|---|
| 6,711,171 B1 | 3/2004 | Dobbins et al. |
| 8,792,388 B2 | 7/2014 | Yamato et al. |
| 10,009,261 B2 * | 6/2018 | Zhang .................... H04L 45/28 |
| 2004/0141465 A1 | 7/2004 | Jo et al. |
| 2011/0261723 A1 | 10/2011 | Yamato et al. |
| 2012/0155467 A1 | 6/2012 | Appenzeller |
| 2013/0148537 A1 | 6/2013 | Uchida |
| 2013/0311640 A1 | 11/2013 | Gleixner et al. |
| 2016/0119204 A1 | 4/2016 | Murasato et al. |
| 2016/0134523 A1 | 5/2016 | Chi et al. |
| 2016/0205014 A1 | 7/2016 | Chen et al. |
| 2016/0248672 A1 * | 8/2016 | Kurita ............... H04W 72/0446 |

FOREIGN PATENT DOCUMENTS

| | | |
|---|---|---|
| EP | 2613480 A1 | 7/2013 |
| JP | 2001237889 A | 8/2001 |
| JP | 2004129054 A | 4/2004 |
| JP | 2014168283 A | 9/2014 |
| JP | 2014-230041 A | 12/2014 |
| TW | 2013/49811 A | 12/2013 |
| WO | 9718637 A2 | 5/1997 |
| WO | 2011043379 A1 | 4/2011 |

OTHER PUBLICATIONS

ONF (Open Networking Foundation) "OpenFlow Switch Specification" Version 1.3.0 (Wire Protocol 0x04), Jun. 25, 2012 (106 pages total).
Extended European Search Report for EP Application No. EP17819956.8 dated Dec. 4, 2019.
Taiwanese Office Action for TW Application No. 106120088 dated Oct. 17, 2019 with English Translation.

* cited by examiner

SERVER, COMMUNICATION METHOD, AND RECORDING MEDIUM

This application is a National Stage Entry of PCT/JP2017/022657 filed on Jun. 20, 2017, which claims priority from Japanese Patent Application 2016-128354 filed on Jun. 29, 2016, the contents of all of which are incorporated herein by reference, in their entirety.

TECHNICAL FIELD

The present invention relates to a server, a switch, a communication system, a communication method, and a recording medium, and more particularly to a server, a switch, a communication system, a communication method, and a recording medium in a Control/User (U/C) separation network.

BACKGROUND ART

Along with the increase in the traffic volume of mobile communication, it is required to increase the capacity of the network system to respond to a large amount of traffic. In particular, Software Defined Network (SDN), which dynamically controls a network based on software, attracts attention as a technique for facilitating control and management of a large-scale network including a large number of communication devices (switches, and the like).

As a protocol for realizing SDN, NPL 1 describes an open flow (OpenFlow) based on a U/C separation network for separating a user plane (data plane) from a control plane.

PTL 1 describes a network visualization device for allowing a user to overview the configuration and operation of the network.

CITATION LIST

Patent Literature

PTL 1 Japanese Patent Laid-Open No. 2014-230041

Non Patent Literature

NPL 1 ONF (Open Networking Foundation), "OpenFlow Switch Specification, Version 1.3.0 (Wire Protocol 0x04)," Jun. 25, 2012, [online], [searched on Jun. 20, 2016], the Internet <URL:https://www.opennetworking.org/images/stories/downloads/sdn-res ources/onf-specifications/openflow/openflow-spec-v1.3.0.pdf>

SUMMARY OF INVENTION

Technical Problem

It is to be understood that the entire disclosures content of the above Patent Literature and Non Patent Literature shall be included into the description herein by reference. The following analysis has been done by the present inventor et al.

When any abnormality occurs in the network, the entry information (transfer entry) used for packet transfer is checked for each switch included in the network, and the work of tracking the data transfer is performed. The abnormality referred to herein is, for example, a malfunction of a communication device such as a switch or disconnection of a cable connecting the switches. However, with such a method, as the number of switches increases, the task of examining individual switches becomes very complicated.

The technique described in PTL 1 is no more than drawing an image indicating cooperation among information services provided on the network and an image indicating a physical network (connection between nodes and switch) that realizes cooperation between information services. The technique described in PTL 1 does not contribute to determining the validity of the forwarding entries stored by the switches.

Therefore, it is an issue to make it possible to easily check the presence or absence of abnormality in the transfer entry stored by the switch. It is an object of the present invention to provide a server, a switch, a communication system, a communication method, and a recording medium that contribute to solving such issue.

Solution to Problem

A server according to first aspect of the present invention includes:
a memory; and
at least one processor coupled to the memory,
the processor performing operations, the operations comprising:
storing topology information indicating a topology of a network composed of a plurality of switches;
generating network route information indicating a communication route on the network based on the topology information;
acquiring, from the switch, a transfer entry learned by the switch based on switch route information indicating a broadcast domain to that a port of the switch included in the network belongs; and
mapping the transfer entry and the network route information to the topology information.

A switch according to second aspect of the present invention constitutes a network. The switch includes:
a memory; and
at least one processor coupled to the memory,
the processor performing operations. The operations includes:
communicating with a server generating network route information indicating a communication route on the network based on topology information indicating a topology of the network;
storing switch route information indicating a broadcast domain to that a port of the switch belongs, and a transfer entry learned based on the switch route information; and
transmitting the transfer entry to the server.

A communication system according to third aspect of the present invention includes:
a server; and
a switch included in a network.
The server includes:
a memory; and
at least one processor coupled to the memory,
the processor performing operations. The operations for the serve includes:
storing topology information indicating a topology of a network composed of a plurality of switches;
generating network route information indicating a communication route on the network based on the topology information;
acquiring a transfer entry from the switch; and
mapping the acquired transfer entry and network route information to the topology information.

The switch includes:
a memory; and
at least one processor coupled to the memory.
the processor performing operations. The operations for the switch includes:
learning the transfer entry based on the switch route information indicating a broadcast domain to that a port of the switch belongs.

A communication method according to fourth aspect of the present invention for a server includes:
storing topology information indicating a topology of a network composed of a plurality of switches;
generating network route information indicating a communication route on the network based on the topology information;
acquiring, from the switch, a transfer entry learned by the switch based on switch route information indicating a broadcast domain to that a port of the switch included in the network belongs; and
mapping the transfer entry and the network route information to the topology information.

A communication method according to fifth aspect of the present invention is a method for a switch. The switch communicates with a server. Based on topology information indicating a topology of a network composed of a plurality of the switches, the server generates network route information indicating a communication route on the network. The method includes:
learning a transfer entry based on switch route information indicating a broadcast domain to that a port of the switch belongs; and
transmitting the transfer entry to the server.

A computer-readable non-transitory medium according to sixth aspect of the present invention has a computer readable program recorded thereon. The program readable program, when executed on a computer, causes the computer to:
store topology information indicating a topology of a network composed of a plurality of switches;
generate network route information indicating a communication route on the network based on the topology information;
acquire, from the switch, a transfer entry learned by the switch based on switch route information indicating a broadcast domain to that a port of the switch included in the network belongs; and
map the transfer entry and the network route information to the topology information.

A computer-readable non-transitory medium according to seventh aspect of the present invention has a computer readable program recorded thereon. The program is a program for a computer. The computer communicates with a server. Based on topology information indicating a topology of a network composed of a plurality of the computer, the server generates network route information indicating a communication route on the network. The program causes the computer to:
learn a transfer entry based on switch route information indicating a broadcast domain to that a port of the computer belongs; and
transmit the transfer entry to the server.

Advantageous Effects of Invention

Based on the server, the switch, the communication system, the communication method, and the recording medium according to the present invention, the presence or absence of abnormality in the transfer entries stored by the switches can be easily checked.

EXAMPLE EMBODIMENT

Figure 1:
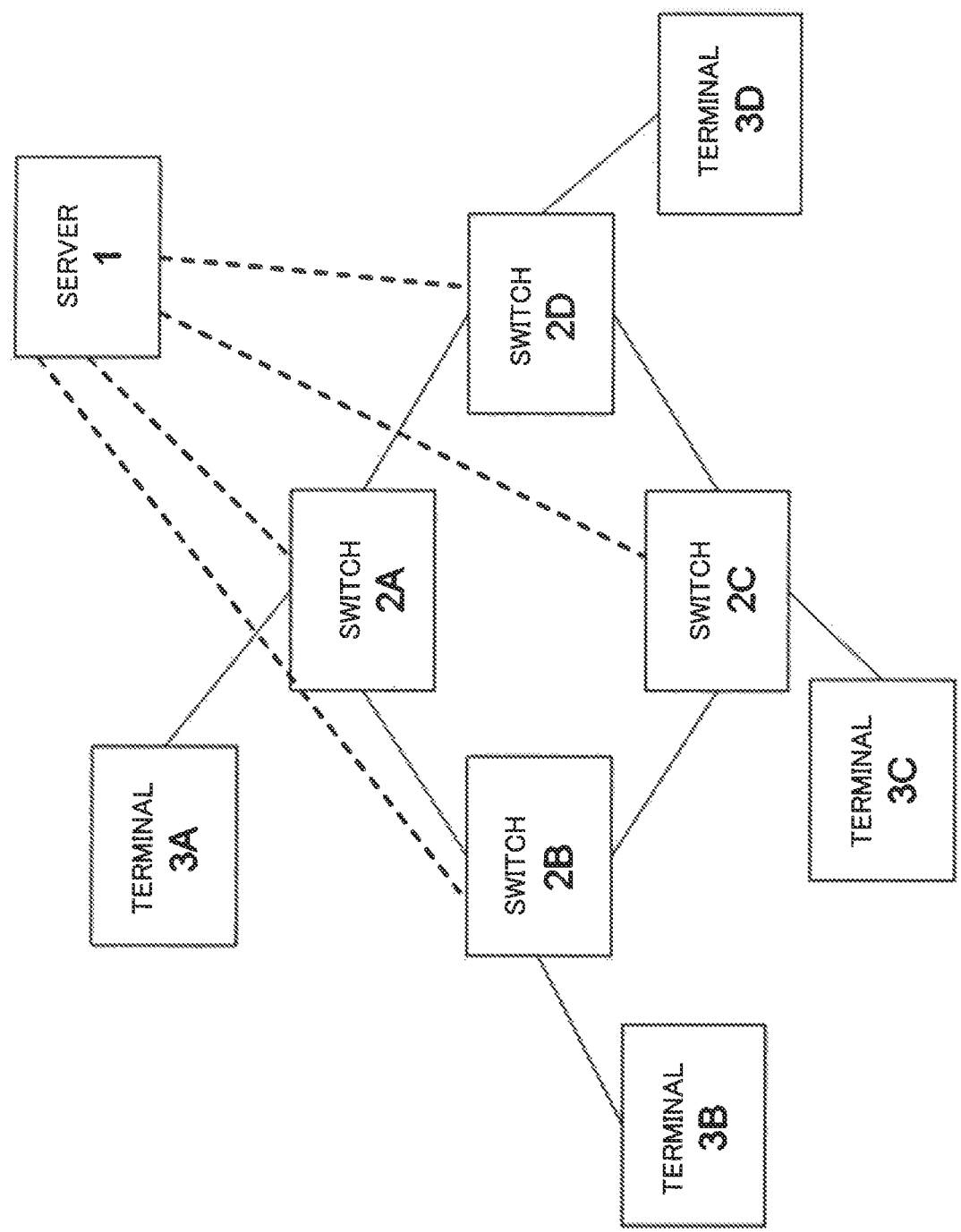
FIG. 1 is a diagram illustrating a configuration of a communication system according to a first example embodiment.

First, a summary of one example embodiment will be described. Note that drawing reference numerals supplementary described in this summary are illustrative only for aiding understanding and are not intended to limit the present invention to the illustrated example embodiment.

Figure 2:
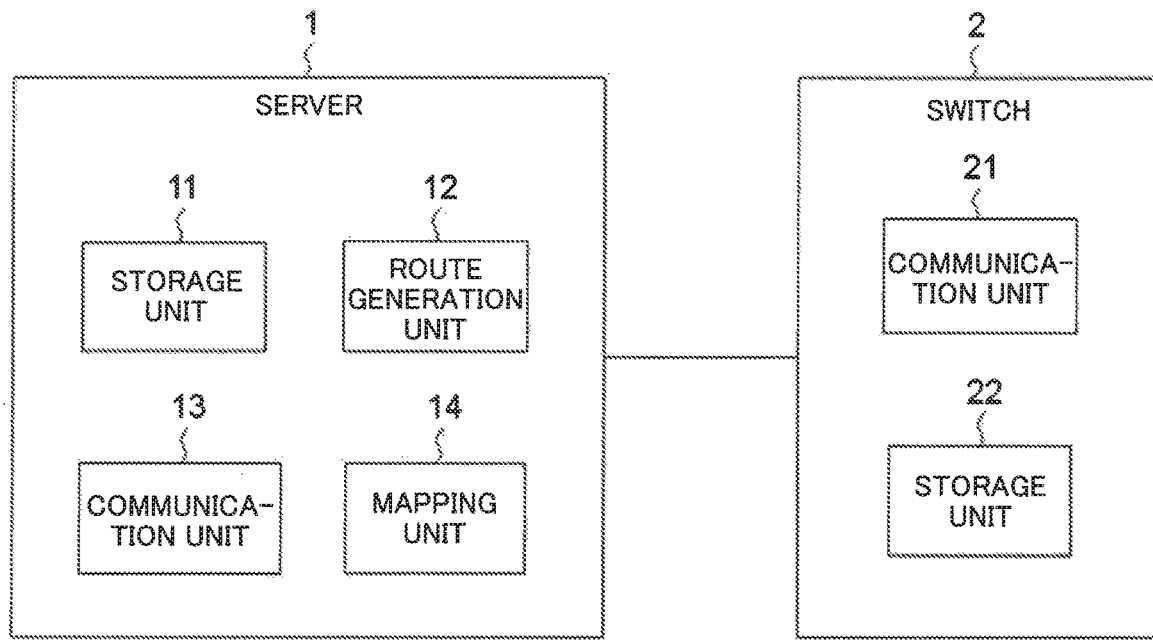
FIG. 2 is a block diagram illustrating configurations of a server and a switch in the communication system according to the first example embodiment.

FIG. 1 is a diagram illustrating a configuration of a communication system according to one example embodiment. FIG. 2 is a block diagram illustrating a configuration of a server 1 and a switch 2 in the communication system. Referring to FIG. 1 and FIG. 2, the server 1 includes a storage unit 11, a route generation unit 12, a communication unit 13, and a mapping unit 14. The storage unit 11 stores topology information indicating the topology of a network composed of a plurality of switches 2A to 2D. The route generation unit 12 generates network route information indicating a communication route on the network (for example, a communication route from the terminal 3A to the terminal 3B, a communication route from the terminal 3A to the terminal 3C in FIG. 10) based on the topology information. The communication unit 13 acquires, from the switches 2A to 2D, the transfer entries trained by the switches 2A to 2D based on switch route information. Each of the switch route information indicates a broadcast domain to which a port of a switch included in the network belongs. The switch route information is information that associates an identifier of the port with an identifier of the VLAN, as illustrated in FIG. 5 to FIG. 8, and information indicating a blocking port. The transfer entry is information that associates a destination MAC address with the output port as illustrated in FIG. 5 to FIG. 8, for example. The mapping unit 14 maps (or associates) the transfer entry and the network route information, which are acquired, on the topology information.

Here, the route generation unit 12 may generate network route information indicating the communication route on the network based on the topology information and the switch route information (for example, switch route information A to D in FIGS. 5 to 8). Each of the transfer entries may be learned of association between an address of a destination (for example, Media Access Control (MAC) address) and the port for an output to the destination, by the switches 2A to 2D based on the switch route information. The above transfer entries are transfer entries A to D in FIGS. 5 to 8, for example. The above switch route information is, for example, switch route information A to D in FIGS. 5 to 8. The above learning is, for example, learning on a flooding tree according to switch route information.

The flooding tree is a tree structure in a network used for flooding for sending a control message.

In addition, when there is no consistency between the collected transfer entry and the network route information (for example, the switch does not store a transfer entry relating to the communication route indicated by the network route information), the mapping unit 14 may determine that an abnormality occurs in the network. Further, the mapping unit 14 may display the communication route indicated by the network route information together with (for example, superimposing) the topology of the network represented by the topology information (see FIG. 10). For example, the communication route is a communication route from terminal 3A to terminal 3B in FIG. 10, and a communication route from terminal 3A to terminal 3C.

In one example embodiment, the server generates the network route information indicating the communication route on the network based on the topology information, and associates the transfer entry acquired from the switch with the network route information. For example, the server checks whether the switch stores a transfer entry relating to the communication route indicated by the network route information. Based on this, the server determines the validity of the transfer entry stored by the switch. Therefore, based on the communication system according to one example embodiment, it is possible to easily check the presence or absence of abnormality in the transfer entry stored by the switch. Furthermore, based on such a communication system, when the network is a U/C separation network, the following visualization can be realized. That is, based on such a communication system, a gap (difference) between the route information of the control plane (C plane) acquired based on the route control and the transfer entry used for actual transfer of the user plane (U plane) can be visualized at the network level.

First Example Embodiment

Next, a communication system according to the first example embodiment will be described with reference to the drawings.

[Configuration]

FIG. 1 is a diagram illustrating a configuration of the communication system according to the present example embodiment. Referring to FIG. 1, the communication system includes a server 1 and switches 2A to 2D. The switches 2A to 2D are connected in a ring shape. FIG. 1 also illustrates terminals 3A to 3D connected to switches 2A to 2D, respectively. The numbers of servers, switches, and terminals illustrated in FIG. 1 and the physical connection configuration (network topology, also simply referred to as topology) are merely examples. The present invention is not limited to the illustrated example embodiment.

FIG. 2 is a block diagram illustrating configurations of the server 1 and the switch 2 according to the present example embodiment. Hereinafter, when it is unnecessary to distinguish the switches 2A to 2D, these switches are collectively referred to as switches 2. Referring to FIG. 2, the server 1 includes a storage unit 11, a route generation unit 12, a communication unit 13, and a mapping unit 14. On the other hand, the switch 2 includes a communication unit 21, which communicates with the server 1, and a storage unit 22.

Figure 3:
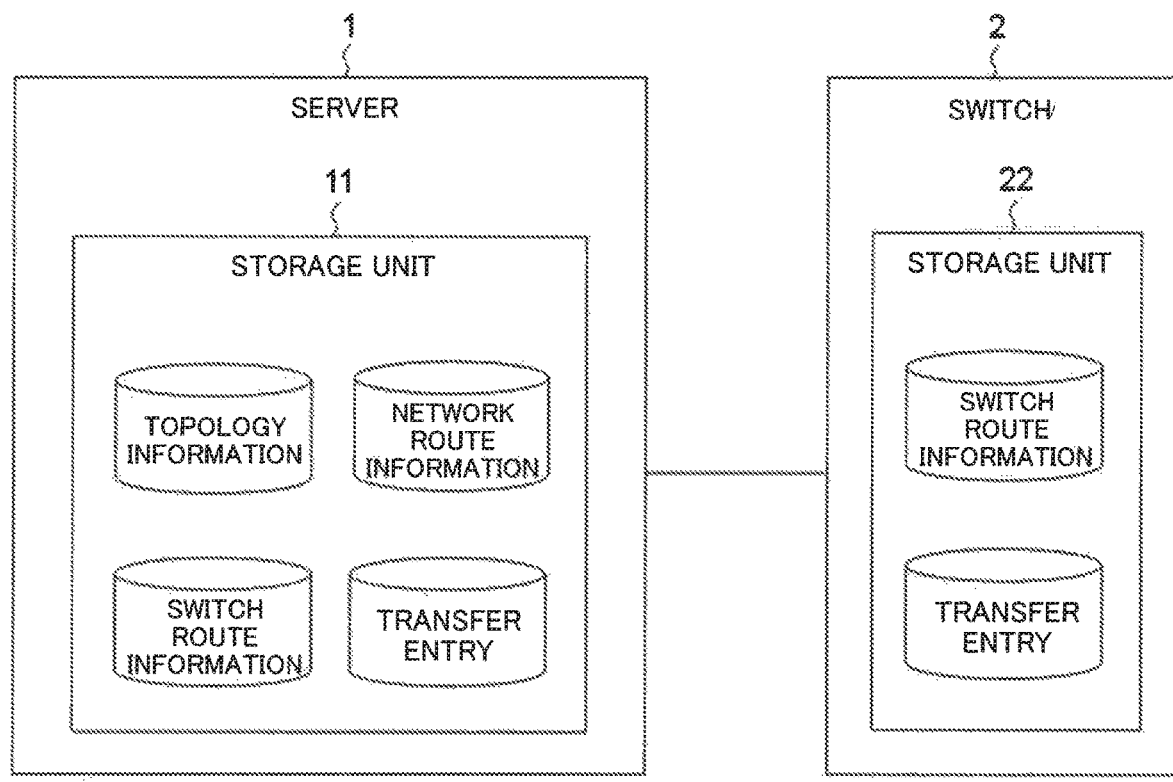
FIG. 3 is a diagram illustrating information stored by the server and the switch in the communication system according to the first example embodiment.

FIG. 3 illustrates information respectively stored by the storage unit 11 of the server 1 and the storage unit 22 of the switch 2. The storage unit 11 of server 1 stores topology information indicating a topology of a network composed of a plurality of switches 2A to 2D (for example, a ring-like physical connection configuration between the switches 2A to 2D). Further, the storage unit 11 stores network route information, switch route information, and transfer entries. On the other hand, the storage unit 22 of the switch 2 stores switch route information and transfer entries. The details about the network route information, the switch route information, and the transfer entry will be described later.

The server 1 can use various methods as methods for collecting the topology information (that is, information indicating physical connection) of switches 2A to 2D. For example, an operator of the network may register the topology information in the server 1. Alternatively, in the case of a network using Open Shortest Path First (OSPF) as a routing protocol, the server 1 may calculate logical network information such as neighbor information. Further, the switches 2A to 2D may transfer its own topology information to the server 1.

Neighbors are routers (neighboring routers or routers on the same subnet as their own device) that exchange Hello packets in OSPF. Neighbor information is information about such routers.

Figure 4:
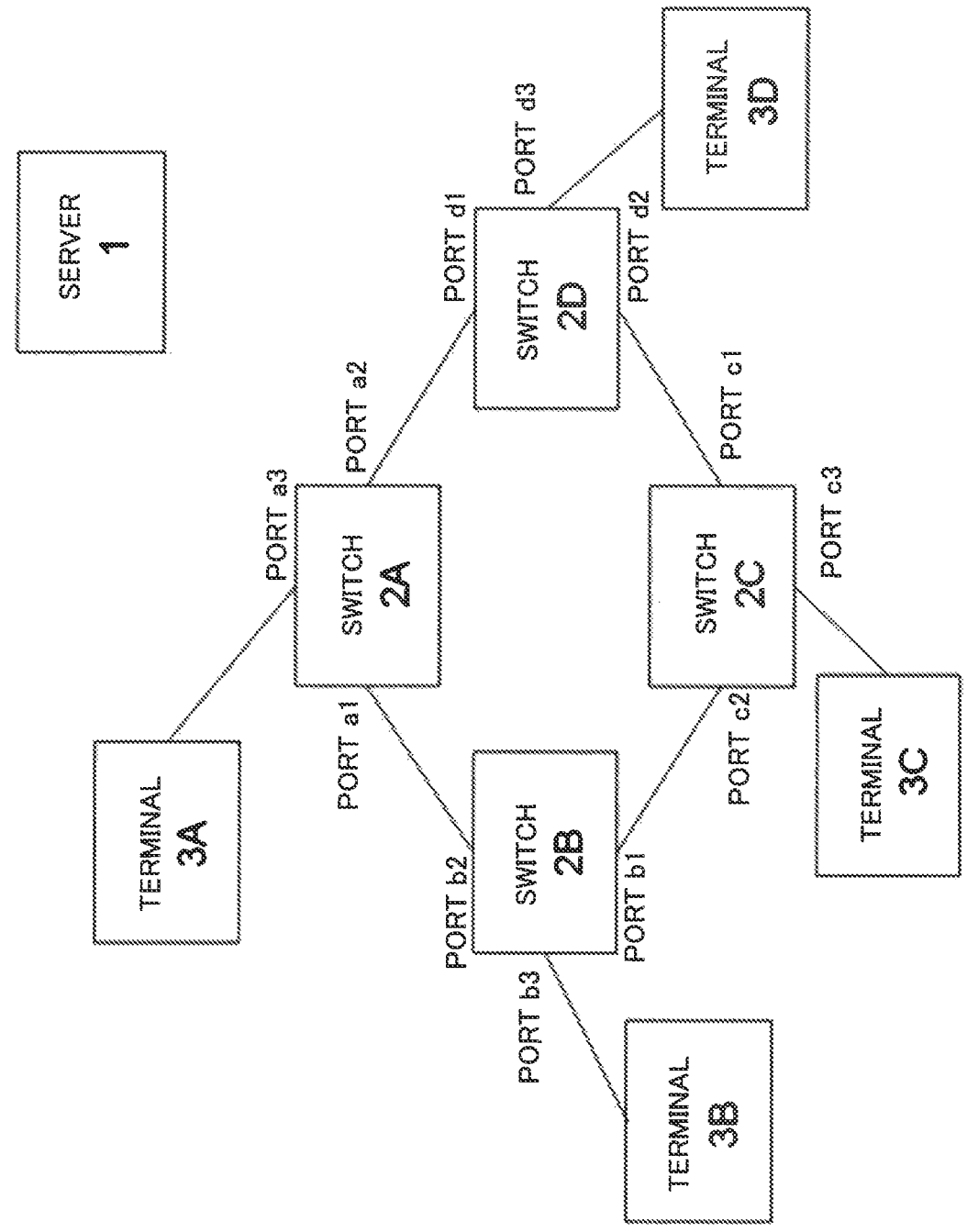
FIG. 4 is a diagram illustrating ports possessed by the switch in the communication system according to the first example embodiment.

FIG. 4 exemplifies ports that switches 2A to 2D have and the connection configuration between switches and between switches and terminals. Referring to FIG. 4, switches 2A to 2D are connected to terminals 3A to 3D via ports a3 to d3, respectively. On the other hand, the switch 2A and the switch 2B are connected via a port a1 and a port b2. Likewise, the switch 2B and the switch 2C are connected via a port b1 and a port c2. The switch 2C and the switch 2D are connected via a port c1 and a port d2. Further, the switch 2D and the switch 2A are connected via a port d1 and a port a2.

The storage unit 22 of the switch 2 stores switch route information and transfer entries. The switch route information represents the broadcast domain to which the port belongs. The switch 2 learns the transfer entry based on the switch route information indicating the broadcast domain. For example, the switch 2 learns the association between an address of a destination (e.g., MAC address) of the packet and the port for an output to the destination on the flooding tree according to the switch route information, and stores the learned association as a transfer entry.

Figure 5:
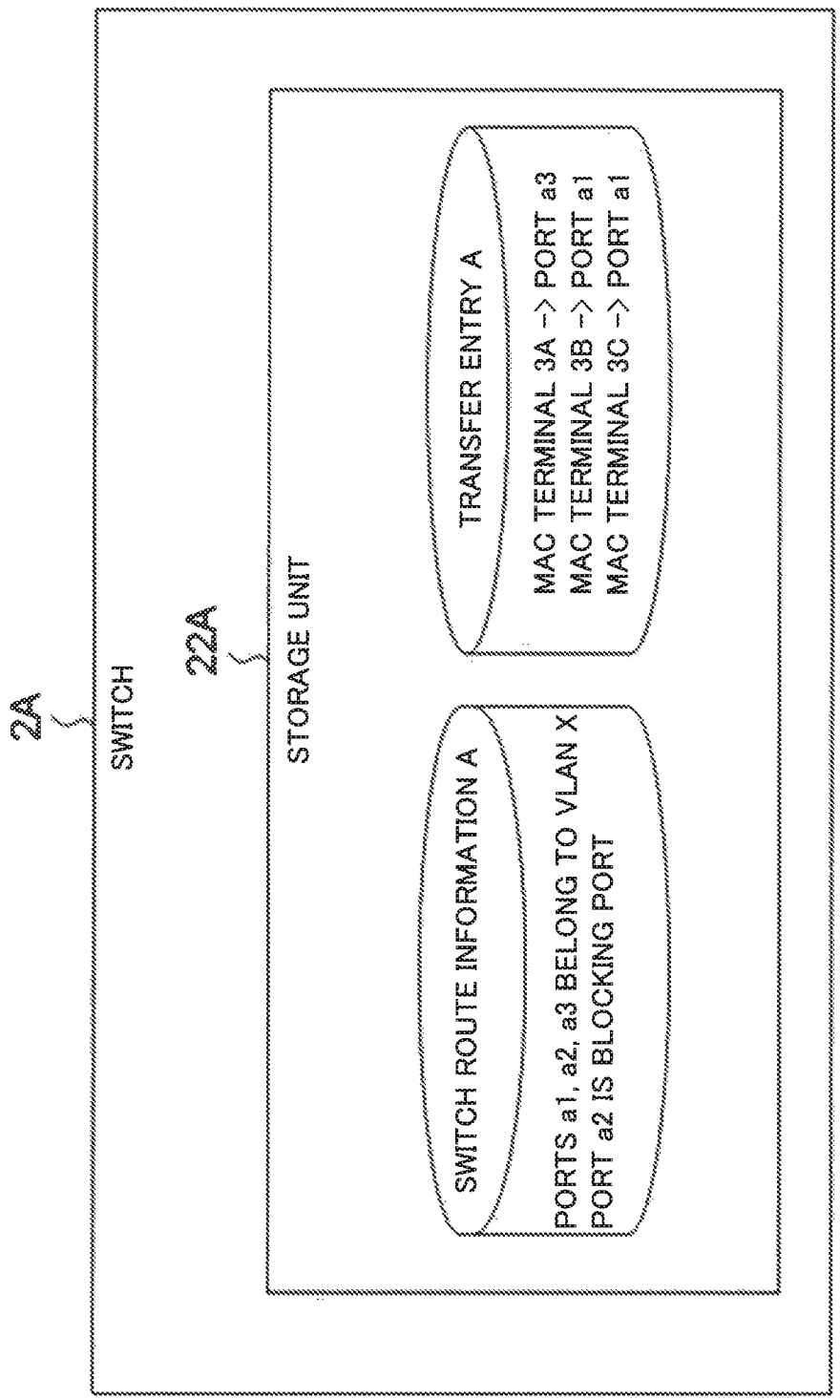
FIG. 5 is a diagram illustrating information stored by a switch 2A in the communication system according to the first example embodiment.

FIG. 5 to FIG. 8 illustrate switch route information A to D and transfer entries A to D stored by storage units 22A to 22D of switches 2A to 2D, respectively. Referring to FIG. 5, the switch 2A stores, as switch route information A, information indicating that "the ports a1 to a3 belong to VLAN X and the port a2 is a blocking port". Further, the switch 2A stores, as transfer entry A, information indicating that "the output ports of packets whose destination MAC addresses relate to the MAC addresses of the terminals 3A, 3B, and 3C are ports a3, a1, and a1, respectively."

Figure 6:
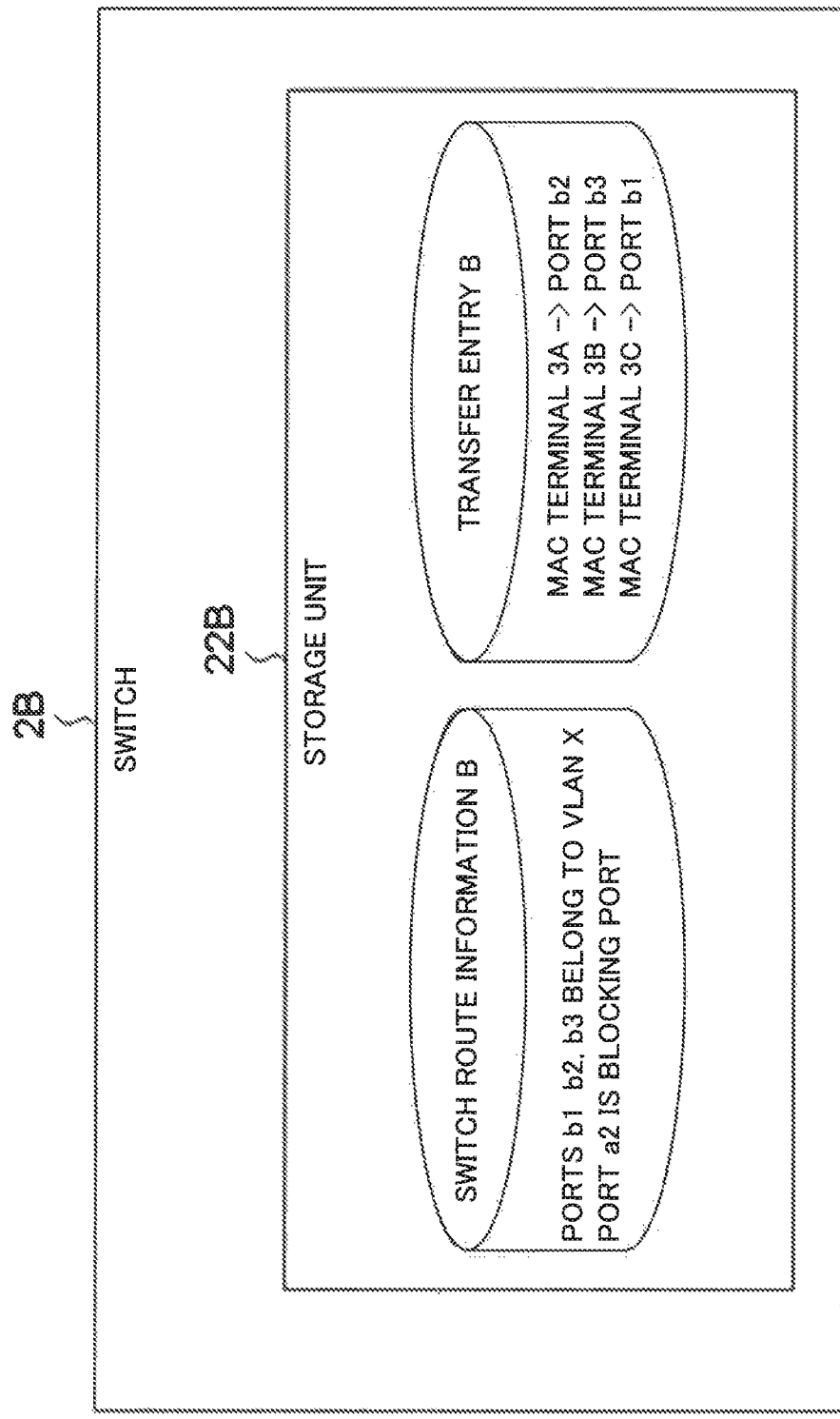
FIG. 6 is a diagram illustrating information stored by a switch 2B in the communication system according to the first example embodiment.

Referring to FIG. 6, the switch 2B stores, as switch route information B, information indicating that "the ports b1 to b3 belong to VLAN X and the port a2 is a blocking port". Further, the switch 2B stores, as transfer entry B, information indicating that "the output ports of packets whose destination MAC addresses relate to the MAC addresses of terminals 3A, 3B, and 3C are ports b2, b3, and b1, respectively".

Figure 7:
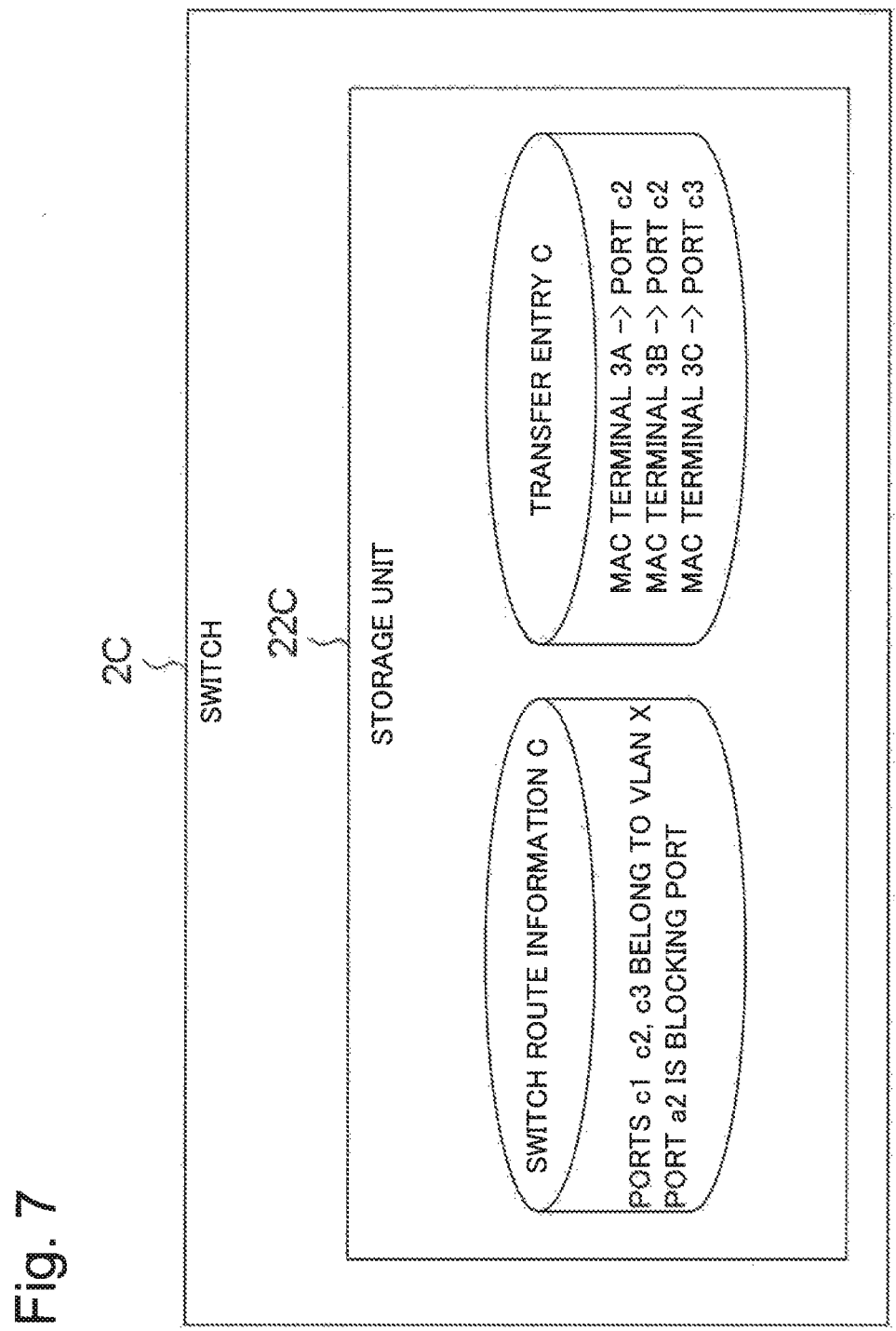
FIG. 7 is a diagram illustrating information stored by a switch 2C in the communication system according to the first example embodiment.

Referring to FIG. 7, the switch 2C stores, as switch route information C, information indicating that "the ports c1 to c3 belong to VLAN X and the port a2 is a blocking port". Further, the switch 2C stores, as transfer entry C, information indicating that "the output ports of packets whose destination MAC addresses relate to the MAC address of the terminals 3A, 3B, and 3C are ports c2, c2, and c3, respectively".

Figure 8:
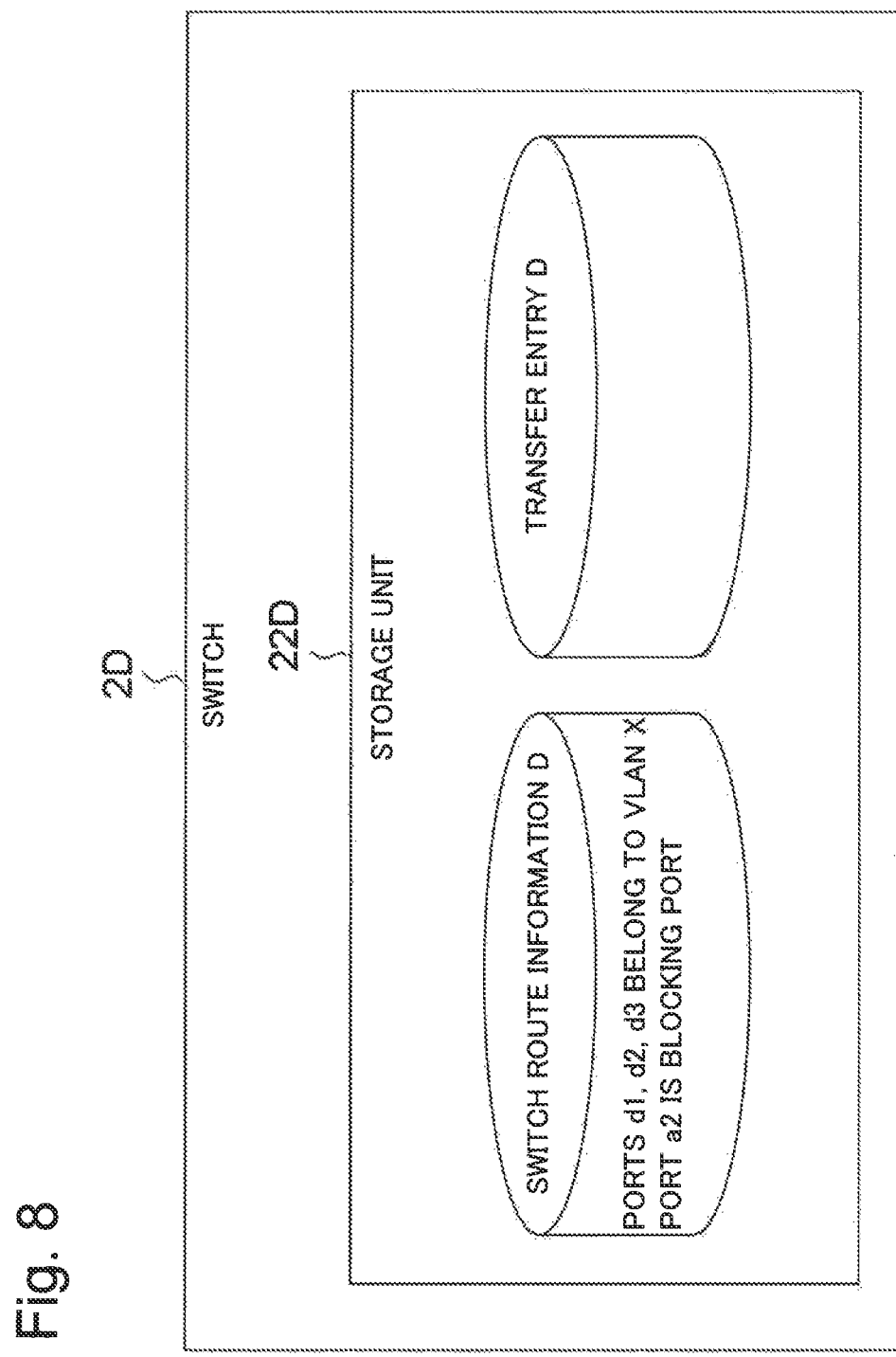
FIG. 8 is a diagram illustrating information stored by a switch 2D in the communication system according to the first example embodiment.

Referring to FIG. 8, the switch 2D stores, as switch route information D, information indicating that "the ports d1 to d3 belong to VLAN X, and the port a2 is a blocking port". The transfer entry D in the switch 2D is empty.

The communication units 21 of the switches 2A to 2D transmit the switch route information A to D and the transfer entries A to D stored by the storage units 22A to 22D of the switches 2A to 2D, respectively, to the server 1.

On the other hand, the communication unit 13 of the server 1 stores switch route information A to D and the transfer entries A to D (FIGS. 5 to 8) acquired from the switches 2A to 2D in the storage unit 11 (FIG. 3). Here, the server 1 can use the following methods as a method for acquiring the switch route information A to D and the transfer entries A to D from the switches 2A to 2D. For example, the server 1 may acquire these pieces of information from switches 2A to 2D by using Simple Network Management Protocol (SNMP). Alternatively, the server 1 may remotely log in to the switches 2A to 2D and collect these pieces of information by using operation commands.

In the server 1, the route generation unit 12 generates network route information indicating a communication route on the network by using at least the topology information stored by the storage unit 11. Note that the route generation unit 12 may generate the network route information based on the topology information and the switch route information A to D acquired from the switches 2A to 2D.

The mapping unit 14 maps (associates) the transfer entries A to D and the network route information on the topology information. For example, the mapping unit 14 checks whether the transfer entry relating to the communication route indicated by the network route information is included in the transfer entries A to D acquired from the switches 2A to 2D. That is, the mapping unit 14 checks whether or not the transfer entry stores the transfer entries A to D in which the switches 2A to 2D reflect the switch route information A to D. Further, the mapping unit 14 may display a diagram illustrating the communication route indicated by the network route information superimposed on a diagram illustrating the connection configuration of the network indicated by the topology information (see FIG. 10). The communication route is, for example, the communication route from the terminal 3A to the terminal 3B or the communication route from the terminal 3A to the terminal 3C in FIG. 10.

The mapping unit 14 may determine that an abnormality occurs in the network when there is no consistency between the transfer entries A to D collected from the switches 2A to 2D and the communication routes indicated by the network route information. Note that the case of no consistency is the case in which the switches 2A to 2D do not store the transfer entries assumed from the switch route information A to D. When the mapping unit 14 determines that a malfunction occurs in the network, the communication unit 13 may instruct the switches 2A to 2D to delete the transfer entries A to D. By deleting the transfer entries A to D, the switches 2A to 2D re-learn the transfer entries (FDB: Forwarding Database) reflecting the correct logical flooding tree acquired by Spanning Tree Protocol (STP), for example.

[Operation]

Next, when given communication configuration (network topology) of the switches 2A to 2D illustrated in FIG. 1 and FIG. 4 and the switch route information A to D illustrated in FIGS. 5 to 8 are given, the operation of the communication system according to the present example embodiment will be explained.

First, the communication unit 13 of the server 1 acquires switch route information A to D and transfer entries A to D (FIGS. 5 to 8) from the switches 2A to 2D.

Next, the route generation unit 12 of the server 1 generates network route information indicating the communication route on the network by referring to the topology information stored by the storage unit 11 and the switch route information A to D acquired from the switches. Note that the topology information is information indicating that the ports of the switches 2A to 2D are connected in a ring shape as illustrated in FIG. 4. More specifically, for example, when the terminal 3A communicates with the VLAN X, the route generation unit 12 detects that a communication route in which the communication of the VLAN X flows on the communication route (flooding tree) that connects with the switch 2A, the switch 2B, the switch 2C, and the switch 2D in this order.

Next, the mapping unit 14 of the server 1 maps (associates) the transfer entries A to D and the network route information on the topology information. That is, the mapping unit 14 of the server 1 checks the following based on tracking the flow on the flooding tree of VLAN X. That is, the mapping unit 14 of the server 1 checks whether the transfer entries relating to the communication route connecting between the terminal 3A and the terminal 3B and the communication route connecting between the terminal 3A and the terminal 3C are included in the transfer entries A to D acquired from the switches 2A to 2D.

As illustrated in FIG. 5, in the transfer entry A of switch 2A, an entry, in which communication addressed to the terminal 3B is transferred to the port a1 and communication addressed to the terminal 3C is transferred to the port a1, is included. As illustrated in FIG. 6, in the transfer entry B of the switch 2B, an entry, in which communication addressed to the terminal 3B is transferred to the port b3 and communication addressed to the terminal 3C is transferred to the port b1, exists. Further, as illustrated in FIG. 7, in the transfer entry C of the switch 2C, an entry, in which communication addressed to the terminal 3C is transferred to the port c3, exists.

Therefore, the mapping unit 14 determines that the switches 2A to 2C store transfer entries relating to the communication route between the terminal 3A and the terminal 3B and the communication route between the terminals 3A and 3C. That is, the mapping unit 14 checks that the switches 2A to 2C have learned transfer entries reflecting the switch route information A to D.

Figure 10:
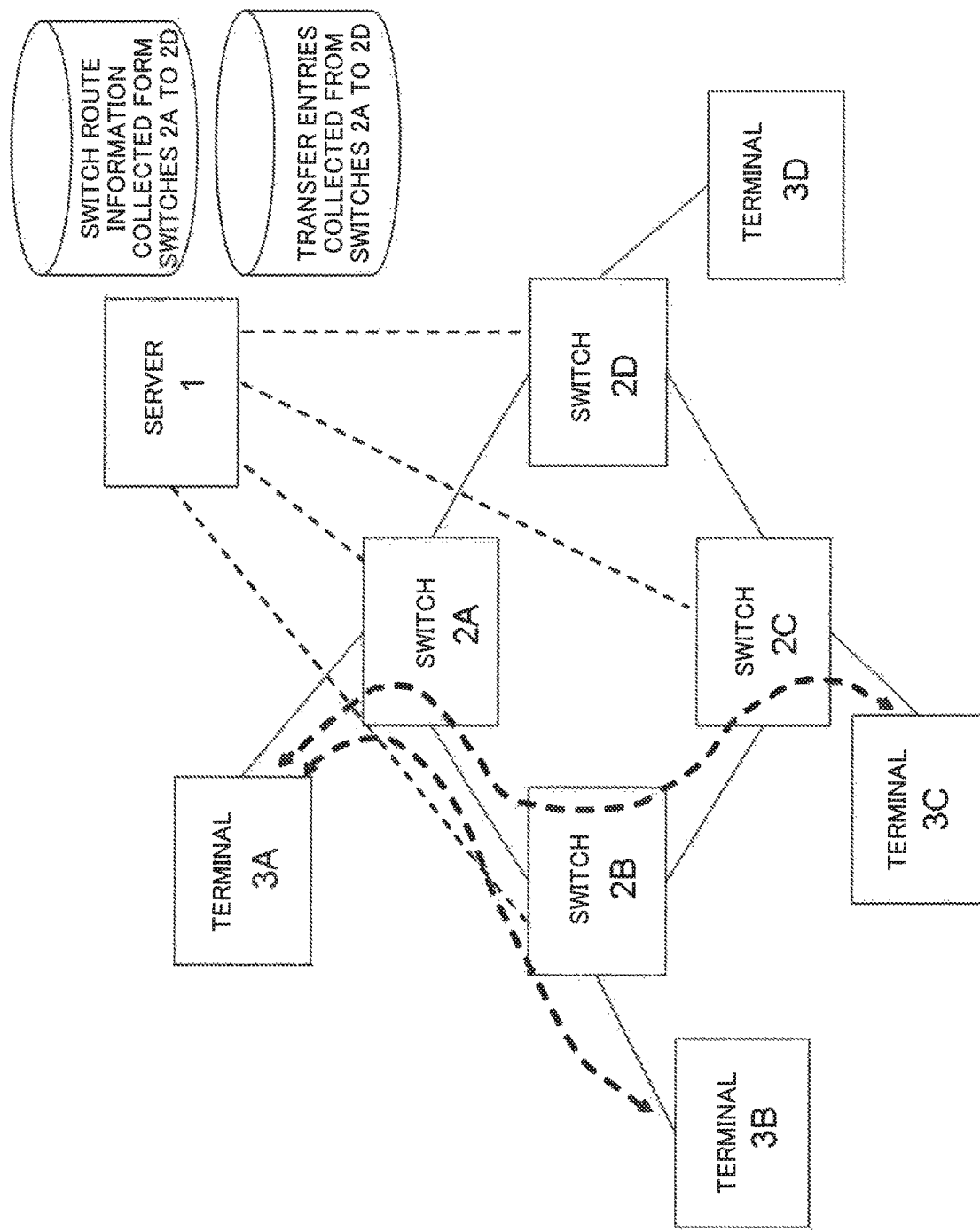
FIG. 10 is a diagram for explaining operation of the communication system according to the first example embodiment.

Further, as illustrated in FIG. 10, the mapping unit 14 displays a diagram illustrating the determined communication route (i.e., the communication route from the terminal 3A to the terminal 3B, and the communication route from the terminal 3A to the terminal 3C) together with a diagram illustrating the connection configuration of the network indicated by the topology information. Based on this, the switch route information A to D set in the switches and the communication relating to the transfer entries A to D learned by the switches are visualized in association with the topology of the entire network. Therefore, the user can get the whole view of the communication realized on the network and can visually easily grasp that the desired communication is realized.

Figure 9:
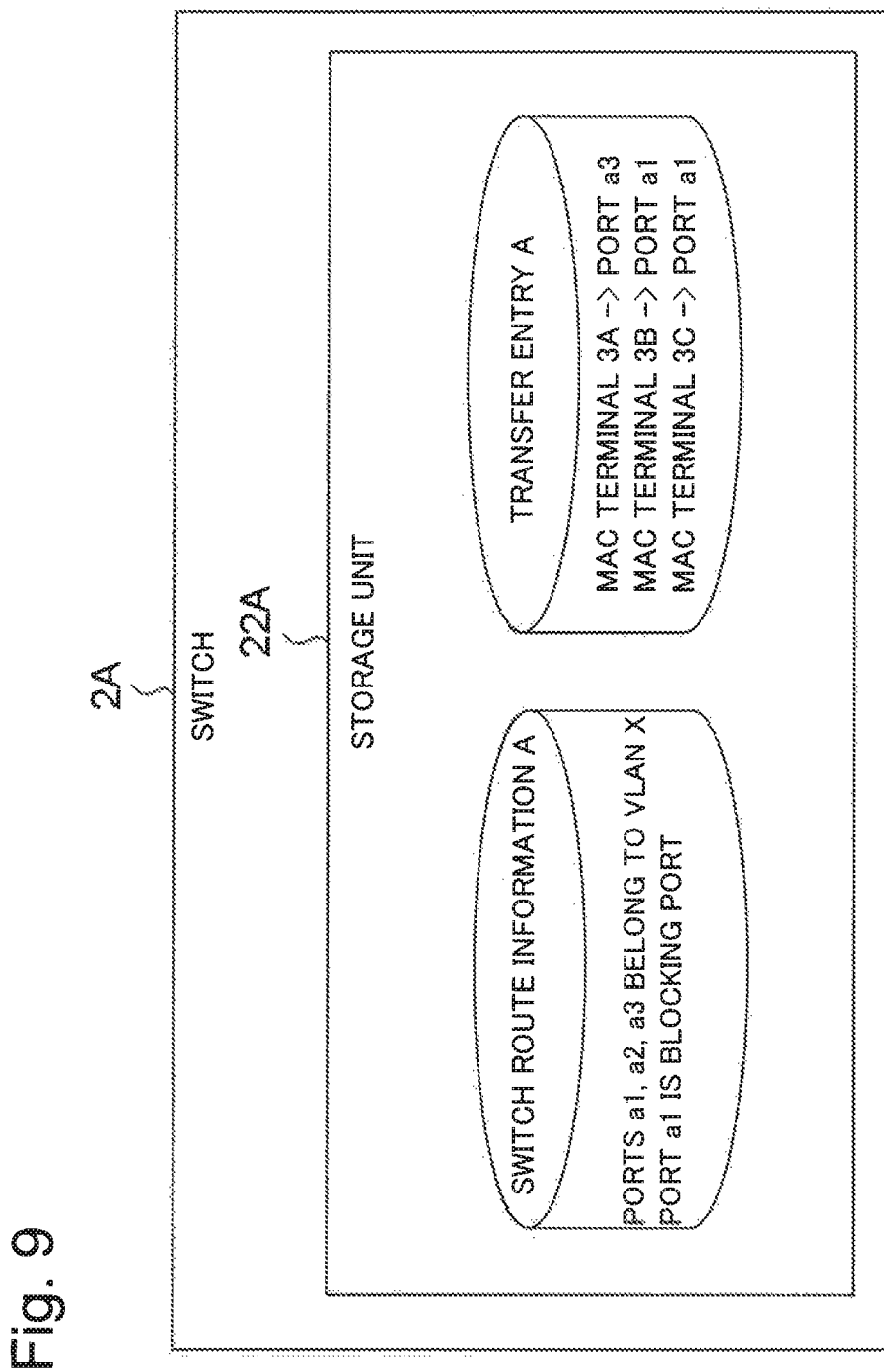
FIG. 9 is a diagram illustrating information stored by the switch 2A in the communication system according to the first example embodiment.

Next, a case in which some failure occurs in the network and the switch route information A to D stored by the switches 2A to 2D do not related to the transfer entries A to D will be described. Here, as an example, it is assumed that the switch 2A stores the switch route information A illustrated in FIG. 9, while the transfer entry D does not exist in the switch 2D.

At this time, the route generation unit 12 of the server 1 determines, by referring to the topology information stored by the storage unit 11 and the switch route information A acquired from the switch 2A, for example, as follows. That is, the route generation unit 12 of the server 1 determines that, when the terminal 3A performs communication of the VLAN X, the communication of the VLAN X flows on a communication route (flooding tree) connected in the order of the switch 2A and the switch 2D. However, since the transfer entry D does not exist in the switch 2D, the mapping unit 14 determines that any trouble has occurred on the network.

In this way, when the mapping unit 14 determines that the switch route information and the transfer entry are contradictory, the communication unit 13 may instruct the switches 2A to 2D to clear (delete) the transfer entries A to D. Based on this, the switches 2A to 2D recover the transfer entries A to D relating to the switch route information A to D by relearning and registering the transfer entries A to D, and, then, solve the network trouble. For example, when MAC learning is not done in the transfer entry (FDB: Forwarding Database) according to Spanning Tree Protocol (STP), FDB learning is performed, as expected by STP, by flushing transfer entry (FDB) once.

[Effect]

Based on the related technology, complicated work is required to acquire transfer entry information from each switch included in the network, and check each acquired transfer entry. On the other hand, in the present example embodiment, the server generates network route information indicating the communication route on the network based on the topology information, and maps (associates) the transfer entries acquired from the switch and the network route information on the topology information. That is, the server checks whether the switch stores a transfer entry relating to the communication route indicated by the network route information. Based on this, the server can determine the validity of the transfer entries stored by the switches. Therefore, based on the communication system according to the present example embodiment, it is possible to easily check the presence or absence of abnormality in the transfer entries stored by the switches. Furthermore, based on the present example embodiment, the state of the network can be visually grasped without logging in to individual switches by the server, which has the network topology information, displaying the transfer entries and the network route information mapped on the topology information.

Second Example Embodiment

Next, a communication system according to the second example embodiment will be described with reference to the drawings. In the present example embodiment, a case in which the network is a U/C separation network separated into a user plane (U plane) and a control plane (C plane) will be described. As a protocol for implementing the U/C separation network, as an example, a case in which Open-Flow (NPL 1) is used will be described. However, in the present invention, the protocol for realizing the U/C separation network is not limited to OpenFlow. Hereinafter, the difference between the present example embodiment and the first example embodiment will be mainly described.

[Configuration]

Figure 11:
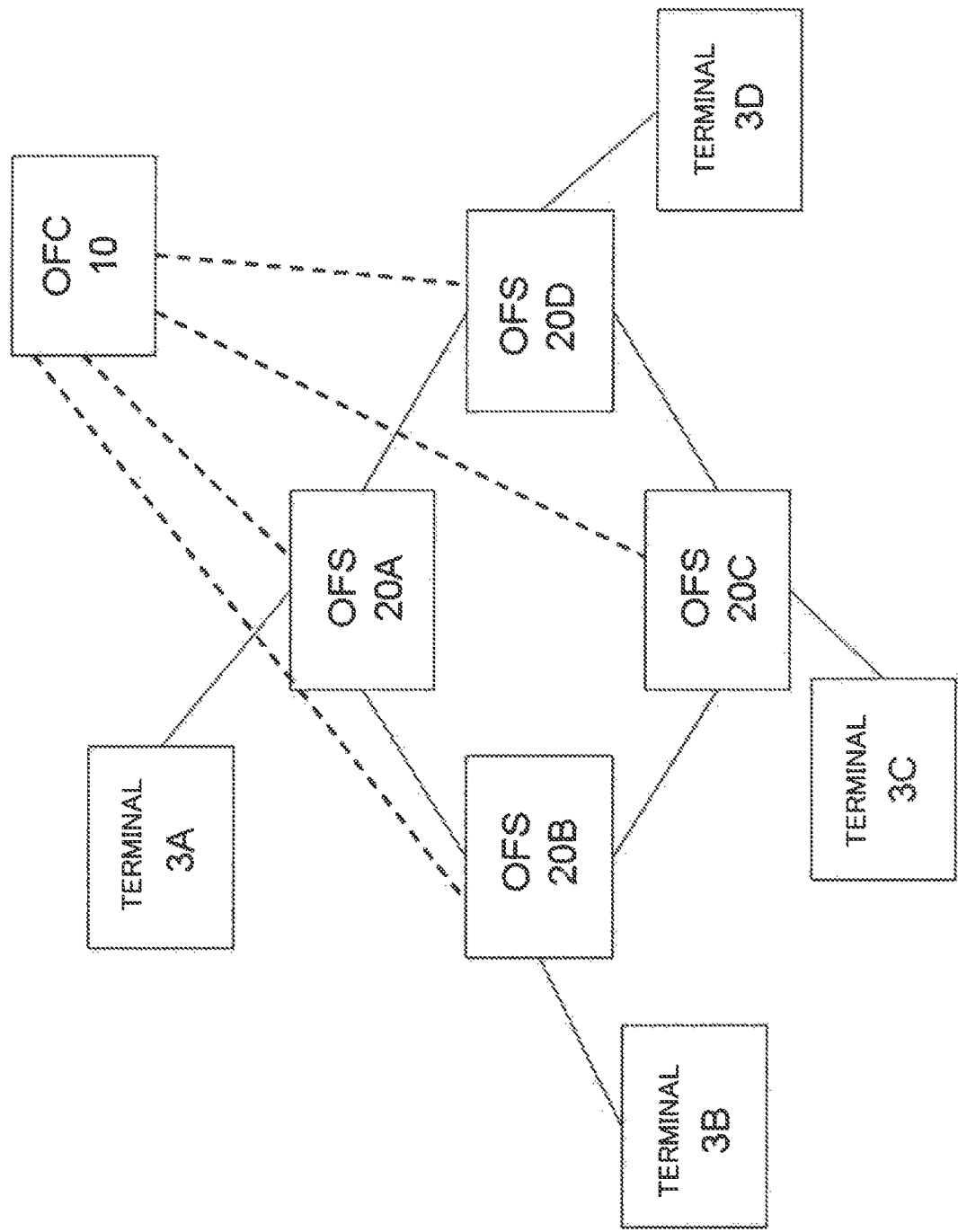
FIG. 11 is a diagram illustrating a configuration of a communication system according to a second example embodiment.

FIG. 11 is a diagram illustrating the configuration of the communication system of the present example embodiment. Referring to FIG. 11, the communication system of the present example embodiment includes an OpenFlow Controller (OFC) 10 and OpenFlow Switches (OFSs) 20A to 20D. The OFSs 20A to 20D are connected in a ring shape. FIG. 11 illustrates the terminals 3A to 3D respectively connected to the OFS 20A to 20D. Note that the numbers of OFCs, OFSs, and terminals and the physical connection configuration illustrated in FIG. 11 are merely examples. The present invention is not limited to the illustrated example embodiment.

Figure 12:
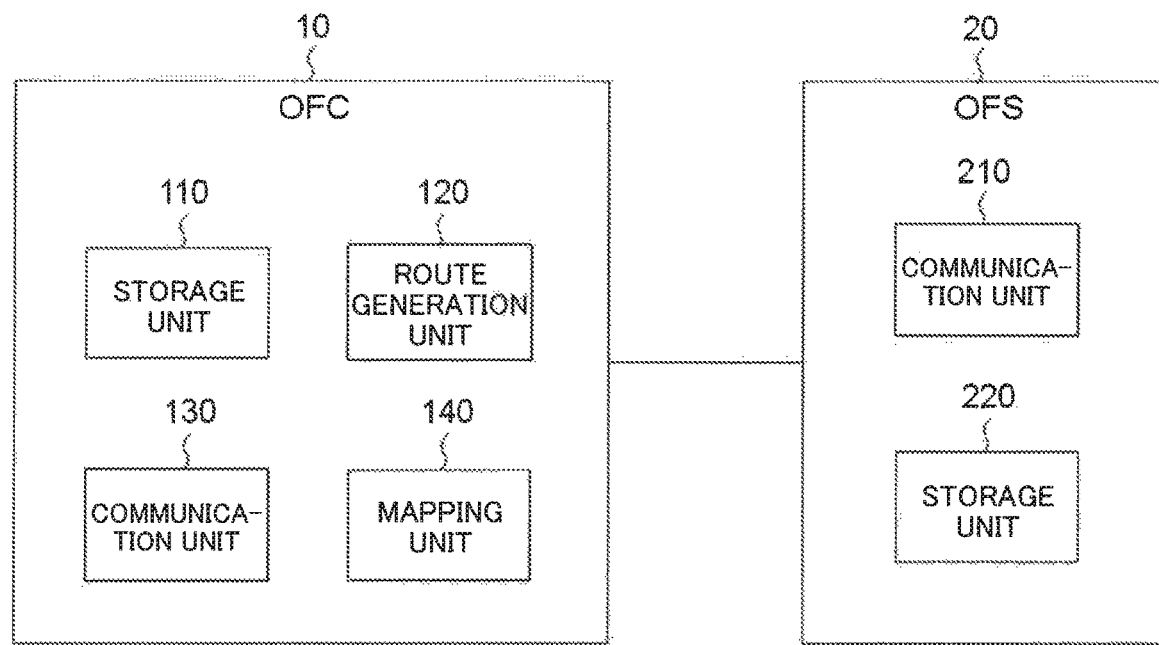
FIG. 12 is a block diagram illustrating a configuration of OpenFlow Controller (OFC) and OpenFlow Switch (OFS) in the communication system according to the second example embodiment.

FIG. 12 is a block diagram illustrating the configuration of the OFC 10 and the OFS 20 according to the present example embodiment. Hereinafter, when it is unnecessary to distinguish the OFSs 20A to 20D, the OFSs 20A to 20D are collectively referred to as the OFSs 20. Referring to FIG. 12, the OFC 10 includes a storage unit 110, a route generation unit 120, a communication unit 130, and a mapping unit 140. On the other hand, the OFS 20 includes a storage unit 220 and a communication unit 210 which communicates with the OFC 10 via a secure channel (OpenFlow channel).

Figure 13:
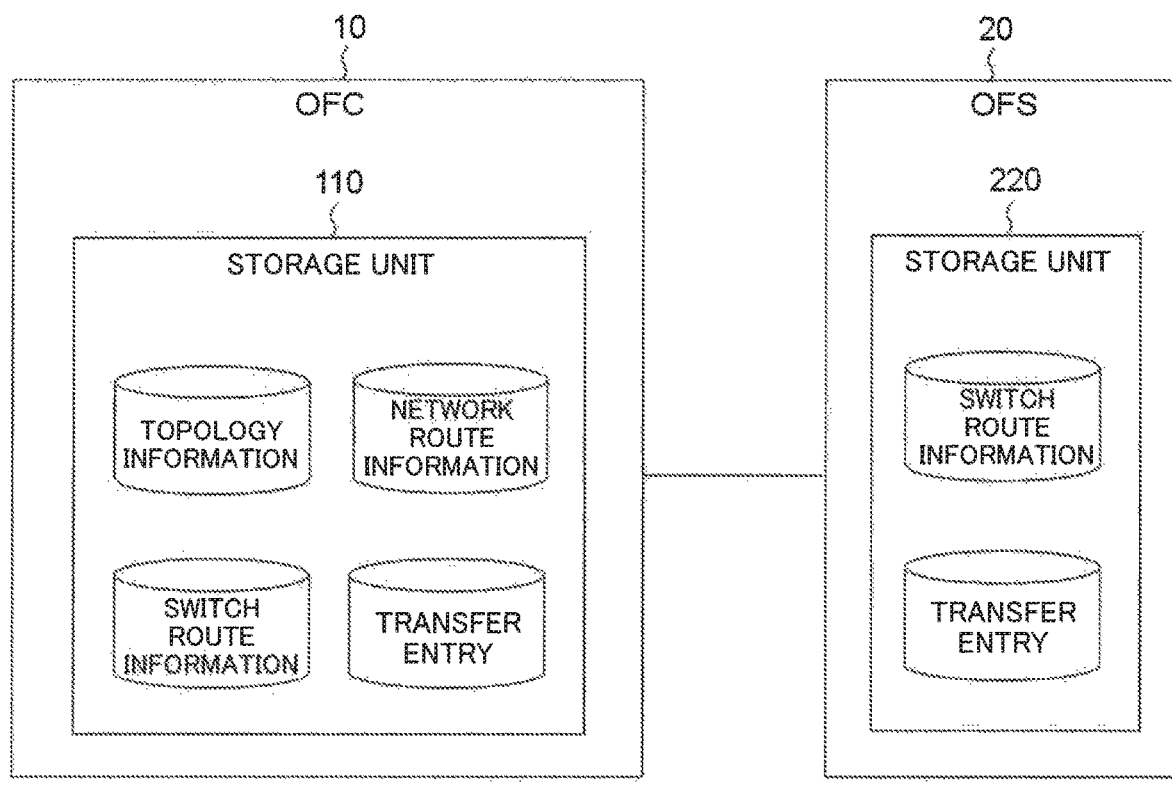
FIG. 13 is a diagram illustrating information stored by the OFC and the OFS in the communication system according to the second example embodiment.

FIG. 13 illustrates the information stored by the storage unit 110 of the OFC 10 and the storage unit 220 of the OFS 20. The storage unit 110 of the OFC 10 stores topology information indicating a topology of a network composed of a plurality of OFSs 20A to 20D (for example, a ring-like physical connection configuration between the OFSs 20A to 20D).

The configurations of the OFC 10 and the OFS 20 of the present example embodiment is similar to the configuration of server 1 and switch 2 in the first example embodiment respectively (see FIG. 2). More specifically, the storage unit 110, the route generation unit 120, the communication unit 130 and the mapping unit 140 of the OFC 10 according to the present example embodiment respectively relate to the storage unit 11, the route generation unit 12, the communication unit 13, and the mapping unit 14 of the server 1 according to the first example embodiment. Similarly, the communication unit 210 and storage unit 220 of the OFS 20 according to the present example embodiment respectively relate to the communication unit 21 and storage unit 22 of the switch 2 according to the first example embodiment. The storage unit 220 of the OFSs 20A to 20D respectively store switch route information and transfer entries illustrated in FIGS. 5 to 8.

In the present example embodiment, the communication unit 130 of the OFC 10 sets the switch route information (see FIG. 5 to FIG. 8) in the OFS 20. The communication unit 210 of the OFS 20 acquires switch route information (see FIG. 5 to FIG. 8) from the OFC 10 and stores the acquired switch route information in the storage unit 220. When sending and receiving switch route information and transfer entries between the OFC 10 and the OFS 20, the present example embodiment can use, for example, an OpenFlow message.

The present example embodiment may adopt, as an example, a method of exchanging a Packet-In message and a Packet-Out message between the OFC 10 and the OFS 20 by using Link Layer Discovery Protocol (LLDP) as a method for the OFC 10 to collect the topology information.

[Operation]

The operation of the communication system according to the present example embodiment is similar as the first example embodiment except that the OFC 10 sets switch route information A to D (see FIG. 5 to FIG. 8) to the OFSs 20.

[Effect]

Based on the communication system of the present example embodiment, the same effects as those of the communication system of the first example embodiment are achieved. Furthermore, based on the present example embodiment, when the network is a U/C separation network, it is also possible to grasp the following. That is, based on the present example embodiment, the gap (difference) between the route information of the control plane (C plane) acquired based on the route control and the transfer entry used for actual transfer in the user plane (U plane) can be grasped by the OFC at the network level. Furthermore, based on the present example embodiment, when OpenFlow is used as the U/C separated network, it is possible to determine the following by checking the flow on the output (Egress) side. That is, based on the present example embodiment, on the basis of the check explained above, it is possible to grasp under which OFS the accessing user is present, track the MAC address in the reverse direction from the route information, and identify an accessing person.

[Schematic Configuration]

The schematic configuration of the server 1 and the switch 2 will be explained.

Figure 14:
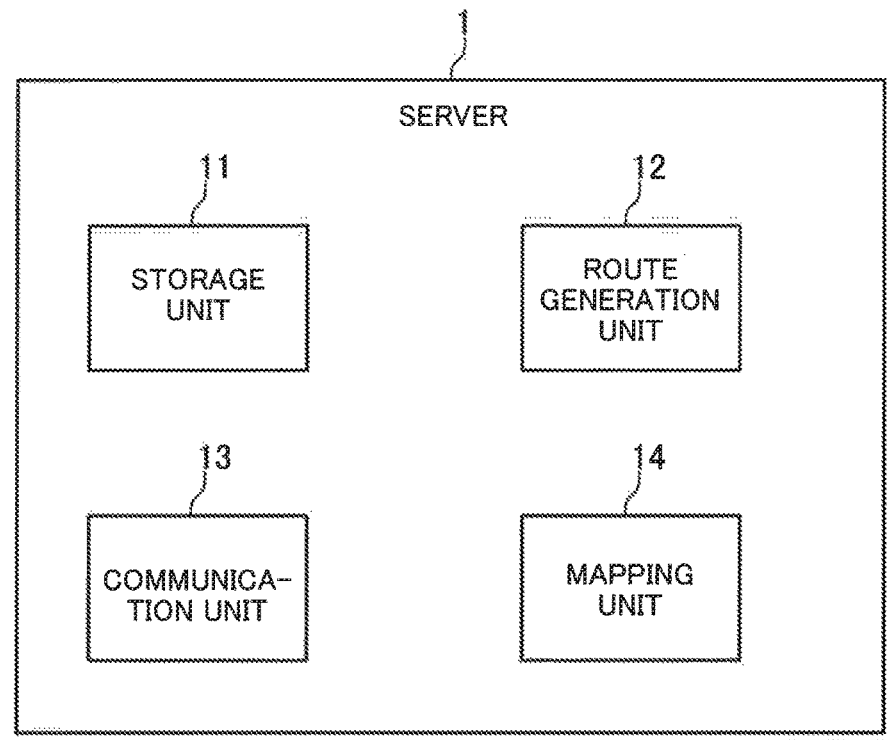
FIG. 14 is a block diagram illustrating a schematic configuration of server.

FIG. 14 is a block diagram illustrating the schematic configuration of the server 1.

The server 1 includes a storage unit 11, a route generation unit 12, a communication unit 13, and a mapping unit 14. The storage unit 11 stores topology information indicating the topology of a network composed of a plurality of switches. The route generation unit 12 generates network route information indicating the communication route on the network based on the topology information. The communication unit 13 acquires, from the switch, the transfer entry learned by the switch based on the switch route information indicating the broadcast domain to which the port of the switch included in the network belongs. The mapping unit 14 maps the transfer entry and the network route information on the topology information.

Figure 15:
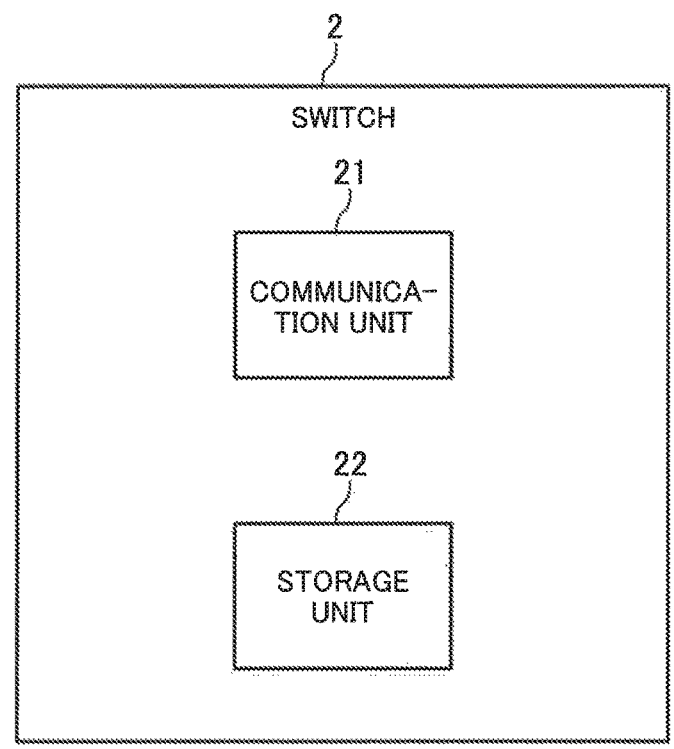
FIG. 15 is a block diagram illustrating a schematic configuration of the switch.

FIG. 15 is a block diagram illustrating the schematic configuration of switch 2.

The switch 2 includes a communication unit 21 and a storage unit 22. Based on topology information indicating a topology of a network composed of a plurality of switches, the communication unit 21 communicates with a server which generates network route information indicating a communication route on the network. The storage unit 22 stores switch route information indicating the broadcast domain to which the port belongs and transfer entries learned based on switch route information.

The server 1 and the switch 2 configured in this way constitutes a predetermined communication system and can achieve the same effects as those of the server 1 and the switch 2 described above. The reason is that, as described above, each configuration of the server 1 and the switch 2 operates in a similar manner to the configurations described above.

Note that the server 1 illustrated in FIG. 14 and the switch 2 illustrated in FIG. 15 are the minimum configuration according to the example embodiment of the present invention.

[Hardware Configuration]

With reference to the drawings, the hardware configuration of the server 1 and the switch 2 explained above will be explained. The server 1 and the switch 2 are configured as follows.

For example, each constituent unit of the server 1 and the switch 2 may be configured by a hardware circuit. Alternatively, in the server 1 and the switch 2, each constituent unit may be configured by using a plurality of devices connected via a network. Alternatively, in the server 1 and the switch 2, a plurality of constituent units may be configured with one piece of hardware. Alternatively, the server 1 and the switch 2 may be realized as a computer device including a Central Processing Unit (CPU), a Read Only Memory (ROM), and a Random Access Memory (RAM). The server 1 and the switch 2 may be realized as a computer device including an Input and Output Circuit (IOC) in addition to the above configuration. Alternatively, the server 1 and the switch 2 may be realized as a computer device including a Network Interface Circuit (NIC) in addition to the above configuration.

Figure 16:
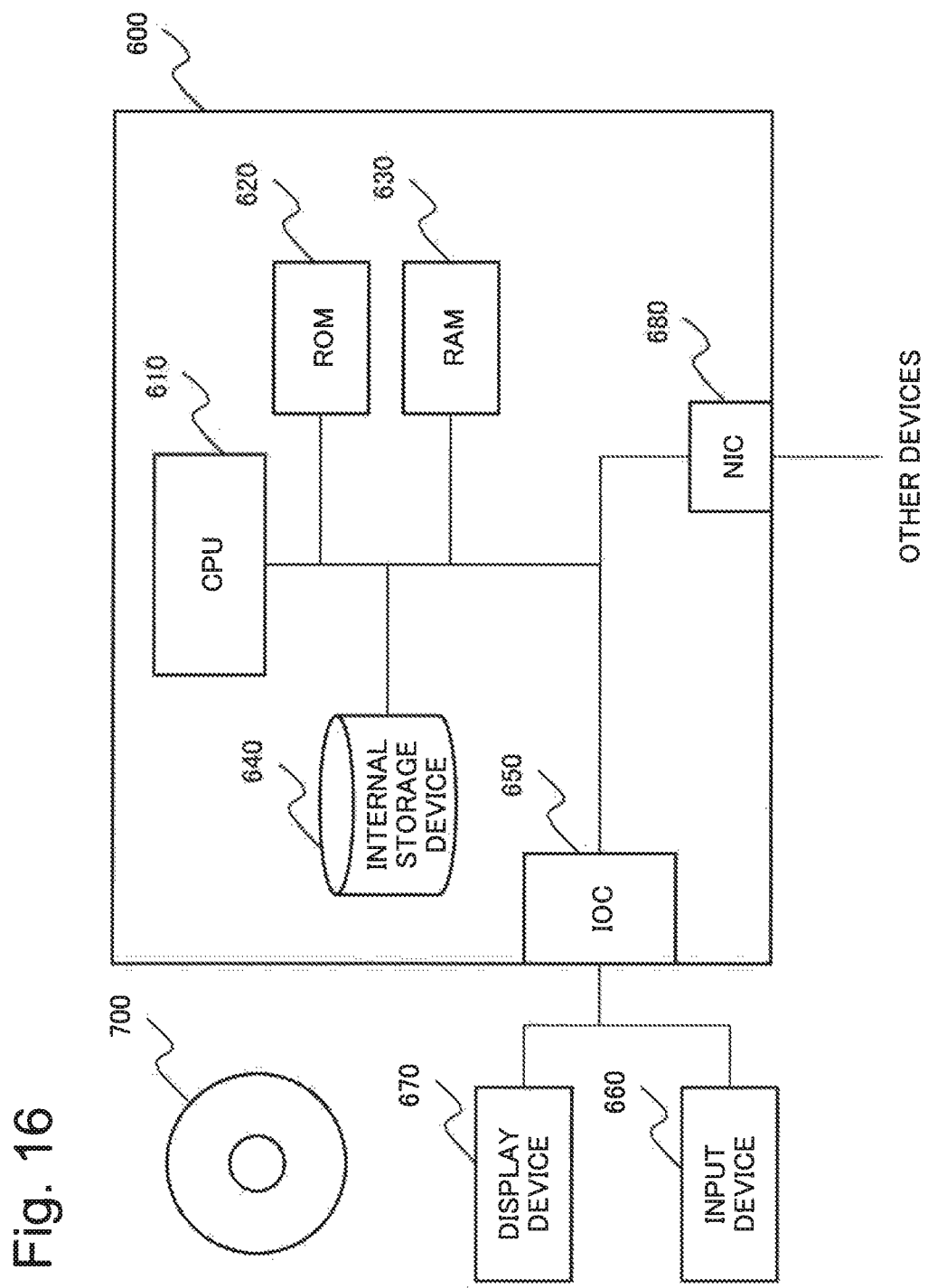
FIG. 16 is a block diagram illustrating an example of a hardware configuration.

FIG. 16 is a block diagram illustrating a configuration of an information processing apparatus 600 which is an example of the hardware configuration of the server 1 and/or the switch 2.

The processing device apparatus 600 includes a CPU 610, a ROM 620, a RAM 630, an internal storage device 640, an IOC 650, and a NIC 680, and constitutes a computer device.

The CPU 610 reads the program from the ROM 620. Then, the CPU 610 controls the RAM 630, the internal storage device 640, the IOC 650, and the NIC 680 based on the read program. The computer including the CPU 610 controls these configurations and configures the functions as the server 1 or the switch 2 illustrated in FIG. 1. Specifically, the computer including the CPU 610 configures the functions of the storage unit 11, the route generation unit 12, the communication unit 13, and the mapping unit 14. Alternatively, the computer including the CPU 610 configures the functions of the communication unit 21 and the storage unit 22.

When each function is configured, the CPU 610 may use the RAM 630 or the internal storage device 640 as a temporary storage medium for the program.

Alternatively, by a computer using a storage medium reading device (not illustrated), the CPU 610 may read a program included in a recording medium 700 storing a program in a computer-readable manner. Alternatively, the CPU 610 may receive a program from an external device (not illustrated) via the NIC 680, store the program in the RAM 630, and operate based on the stored program.

The ROM 620 stores a program executed by the CPU 610 and fixed data. The ROM 620 is, for example, a Programmable-ROM (P-ROM) or a flash ROM.

The RAM 630 temporarily stores a program and data to be executed by the CPU 610. The RAM 630 is, for example, a D-RAM (Dynamic-RAM).

The internal storage device 640 stores data and a program that the processing device apparatus 600 stores for a long period of time. The internal storage device 640 operates as the storage unit 11. Alternatively, the internal storage device 640 operates as the storage unit 22. The internal storage device 640 may operate as a temporary storage device of the CPU 610. The internal storage device 640 is, for example, a hard disk device, a magneto-optical disk device, a Solid State Drive (SSD), or a disk array device.

Here, the ROM 620 and the internal storage device 640 are non-transitory storage media. The RAM 630, on the other hand, is a transitory storage medium. The CPU 610 can operate based on a program stored in the ROM 620, the internal storage device 640, or the RAM 630. That is, the CPU 610 can operate using a nonvolatile storage medium or a volatile storage medium.

The IOC 650 mediates data between the CPU 610, an input device 660, and a display device 670. The IOC 650 is, for example, an IO interface card or a Universal Serial Bus (USB) card. Further, the IOC 650 is not limited to a wired connection such as USB but may use wireless connection.

The input device 660 is a device which receives an input instruction from the operator of the processing device apparatus 600. The input device 660 is, for example, a keyboard, a mouse or a touch panel.

The display device 670 is a device that displays information to the operator of the processing device apparatus 600. The display device 670 is, for example, a liquid crystal display.

The NIC 680 relays exchange of data with an external device (not illustrated) via the network. The NIC 680 operates as a communication unit 13. Alternatively, the NIC 680 operates as the communication unit 21. The NIC 680 is, for example, a Local Area Network (LAN) card. Further, the NIC 680 is not limited to a wired connection but may use wireless connection.

The processing device apparatus 600 thus configured can acquire the same effects as those of the server 1 or the switch 2.

This is because the CPU 610 of the processing device apparatus 600 can realize the same functions as those of the server 1 or the switch 2 based on the program.

The whole or part of the exemplary example embodiments disclosed above can be described as, but not limited to, the following supplementary notes.

In the present invention, the following Modes are possible.

(Supplementary Note 1)
[Mode 1]
Mode 1 is as described as the server according to the first aspect.

(Supplementary Note 2)
[Mode 2]
The server according to mode 1, wherein
the operations further comprises
generating the network route information based on the topology information and the switch route information.

(Supplementary Note 3)
[Mode 3]
The server according to mode 1 or 2, wherein
the transfer entry is learned of association between an address of a destination and the port for output to the destination by the switch based on the switch route information.

(Supplementary Note 4)
[Mode 4]
The server according to any one of modes 1 to 3, wherein
the operations further comprises
when there is no consistency between the transfer entry collected and the network route information, determining that an error occurs in the network.

(Supplementary Note 5)
[Mode 5]
The server according to mode 4, wherein
the operations further comprises
when the mapping means determines that an abnormality occurs in the network, instructing the switch to delete the transfer entry.

(Supplementary Note 6)
[Mode 6]
The server according to any one of modes 1 to 5, wherein
the operations further comprises
acquiring the switch route information from the switch along with the transfer entry.

(Supplementary Note 7)
[Mode 7]
The server according to any one of modes 1 to 7, wherein
the network is a U/C separation network in that a user plane and a control plane are separated, and
the operations further comprises
setting the switch route information in the switch.

(Supplementary Note 8)
[Mode 8]
Mode 8 is as described as the switch according to the second aspect.

(Supplementary Note 9)
[Mode 9]
The switch according to mode 8, wherein
the operations further comprises
storing, as the transfer entry, association between an address of a destination and the port for output to the destination, the association learned based on the switch route information.

(Supplementary Note 10)
[Mode 10]
The switch according to mode 8 or 9, wherein
the operations further comprises
transmitting the switch route information along with the transfer entry to the server.

(Supplementary Note 11)
[Mode 11]
The switch according to mode 8 or 9, wherein
the network is a U/C separation network in that a user plane and a control plane are separated, and
the operations further comprises
acquiring the switch route information from the server.

(Supplementary Note 12)
[Mode 12]
Mode 12 is as described as the communication system according to the third aspect.

(Supplementary Note 13)
[Mode 13]
Mode 13 is as described as the communication method according to the fourth aspect.
(Supplementary Note 14)
[Mode 14]
Mode 14 is as described as the communication method according to the fifth aspect.
(Supplementary Note 15)
[Mode 15]
Mode 15 is as described as the recording medium for recording the program according to the sixth aspect.
(Supplementary Note 16)
[Mode 16]
Mode 16 is as described as the recording medium for recording the program according to the seventh aspect.

It is to be understood that the entire disclosure content of the above PTL and NPL shall be included into the description herein by reference. Within the framework of the entire disclosure (including the scope of claims) of the present invention, furthermore, the example embodiment can be changed or adjusted based on the basic technical concept. Furthermore, within the framework of the entire disclosure of the present invention, various combinations or selections of various disclosed elements (including each element of each claim, each element of each example embodiment, each element of each drawing, and the like) can be performed. In other words, it is to be understood that the present invention includes various modifications and changes that can be made by those skilled in the art along to the entire disclosure including the claims and the technical ideas. In particular, with respect to the numerical range described in this document, any numerical value or subrange included within the range should be interpreted as being specifically described even when not mentioned otherwise.

While the invention has been particularly illustrated and described with reference to exemplary example embodiments thereof, the invention is not limited to these example embodiments. It will be understood by those of ordinary skill in the art that various changes in form and details may be made therein without departing from the spirit and scope of the present invention as defined by the claims.

This application is based upon and claims the benefit of priority from Japanese patent application No. 2016-128354, filed on Jun. 29, 2016, the disclosure of which is incorporated herein in its entirety by reference.

REFERENCE SIGNS LIST

1 Server
2, 2A to 2D Switch
3A to 3D Terminal
a1 to a3, b1 to b3, c1 to c3, d1 to d4 Port
10 OFC
11, 110 Storage unit
12, 120 Route generation unit
13, 130 Communication unit
14, 140 Mapping unit
20, 20A to 20D OFS
21, 210 Communication unit
22, 22A to 22D, 220 Storage unit
600 Processing device apparatus
610 CPU
620 ROM
630 RAM
640 Internal storage device
650 IOC
660 Input device
670 Display device
680 NIC
700 Recording medium

What is claimed is:

1. A server comprising:
a memory; and
at least one processor coupled to the memory,
the processor performing operations, the operations comprising:
storing topology information indicating a topology of a network composed of a plurality of switches;
generating network route information indicating a communication route on the network based on the topology information;
acquiring, from a switch, among the plurality of switches, a transfer entry learned by the switch based on switch route information indicating a broadcast domain to which a port of the switch included in the network belongs; and
mapping the transfer entry and the network route information to the topology information.

2. The server according to claim 1, wherein
the operations further comprises
generating the network route information based on the topology information and the switch route information.

3. The server according claim 1, wherein
the transfer entry is learned of association between an address of a destination and the port for output to the destination by the switch based on the switch route information.

4. The server according to claim 1, wherein
the operations further comprises
when there is no consistency between the transfer entry collected and the network route information, determining that an error occurs in the network.

5. The server according to claim 4, wherein
the operations further comprises
when the mapping means determines that an abnormality occurs in the network, instructing the switch to delete the transfer entry.

6. The server according to claim 1, wherein
the operations further comprises
acquiring the switch route information from the switch along with the transfer entry.

7. The server according to claim 1, wherein
the network is a U/C separation network in that a user plane and a control plane are separated, and
the operations further comprises
setting the switch route information in the switch.

8. A communication method for a server comprising:
storing topology information indicating a topology of a network composed of a plurality of switches;
generating network route information indicating a communication route on the network based on the topology information;
acquiring, from a switch, among the plurality of switches a transfer entry learned by the switch based on switch route information indicating a broadcast domain to which a port of the switch included in the network belongs; and
mapping the transfer entry and the network route information to the topology information.

9. A computer-readable non-transitory medium having a computer readable program recorded thereon, wherein the computer readable program, when executed on a computer, causes the computer to:

store topology information indicating a topology of a network composed of a plurality of switches;
generate network route information indicating a communication route on the network based on the topology information;
acquire, from a switch, among the plurality of switches a transfer entry learned by the switch based on switch route information indicating a broadcast domain to which a port of the switch included in the network belongs; and
map the transfer entry and the network route information to the topology information.

* * * * *